United States Patent [19]
Andres et al.

[11] Patent Number: 5,499,855
[45] Date of Patent: Mar. 19, 1996

[54] LOCKING ARRANGEMENT FOR SECURING A PIVOTING AND SLIDING COVER TO A COUNTER-STRUCTURE OF A VEHICLE BODY

[75] Inventors: Rudolf Andres, Sindelfingen; Holger Seel; Kurt Schaible, both of Aidlingen, all of Germany

[73] Assignee: Mercedes-Benz AG, Germany

[21] Appl. No.: 228,014

[22] Filed: Apr. 15, 1994

[30] Foreign Application Priority Data

Apr. 15, 1993 [DE] Germany .......................... 43 12 323.6

[51] Int. Cl.⁶ .................................................. B60J 7/00
[52] U.S. Cl. ...................... 296/121; 292/DIG. 5
[58] Field of Search ............................. 296/107, 121, 296/224, 221, 222; 292/DIG. 5, DIG. 51, DIG. 57; 49/465

[56] References Cited

U.S. PATENT DOCUMENTS

| | | | |
|---|---|---|---|
| 1,256,992 | 2/1918 | Edgar et al. | 292/DIG. 57 |
| 2,240,400 | 4/1941 | Johnson | 292/DIG. 57 |
| 4,647,106 | 3/1987 | Fürst | 296/222 |
| 4,974,902 | 12/1990 | Huiyer | 296/224 |
| 5,042,869 | 8/1991 | Brin | 296/121 |
| 5,046,767 | 9/1991 | Muscat | 292/DIG. 5 |

FOREIGN PATENT DOCUMENTS

| | | |
|---|---|---|
| 239691 | 9/1925 | United Kingdom. |
| 384356 | 12/1932 | United Kingdom. |
| 503686 | 4/1939 | United Kingdom. |
| 815561 | 6/1959 | United Kingdom. |
| 2237061 | 4/1991 | United Kingdom. |

*Primary Examiner*—Dean Kramer
*Attorney, Agent, or Firm*—Evenson, McKeown, Edwards & Lenahan

[57] ABSTRACT

A locking arrangement for securing a pivoting and sliding cover to a counter-structure of a vehicle body, in particular for folding hoods of convertibles, has a fastening pin which is disposed on the cover and protrudes from the rear side of the cover, a catch fastening which is disposed on the counter-structure and interacts with the fastening pin in the locking operation and an intrusion guide for the intrusion of the fastening pin into the catch fastening via a notch, mounted in front of the locking catch, on the counter-structure. To enable an auxiliary mechanism to be less expensive and more space-saving, elements which interact during the closing of the cover are deflection apparatus which butt against each other. A sliding advancement of the cover, which is maintained after the deflection apparatus are run up against, can be partially converted into transverse advancement of the cover which accompanies the axial advancement of the fastening pin.

10 Claims, 3 Drawing Sheets

LOCKING ARRANGEMENT FOR SECURING A PIVOTING AND SLIDING COVER TO A COUNTER-STRUCTURE OF A VEHICLE BODY

BACKGROUND AND SUMMARY OF THE INVENTION

The present invention relates to a locking arrangement for securing a pivoting and sliding cover to a counter-structure of a vehicle body, in particular for folding hoods of convertibles, comprising a catch fastening on the counter structure configured to interact with the fastening pin in a locking operation, and a notch on the counter-structure to constitute an intrusion guide for intrusion of the fastening pin into the catch fastening. An auxiliary mechanism provides axial advancement of the fastening pin in the notch and causes transverse advancement of the cover, the auxiliary mechanism comprising respective elements on the cover and the counter-structure.

A known type of locking arrangement is described, for example, in DE-C1 39 24 295. There the cover is a roof cap which forms the front end-closure of the folding hood and can be locked in a rest setting on a front roof frame of the body of the convertible. The known folding hood is provided with an electrohydraulic hood drive, by which the hood is actuated automatically by push-button. In closing the hood, the roof cap is moved forward on a circular circuit until the two fastening pins protruding from its bottom side, having previously been guided by centering pods in the roof frame, latch-lock into associated hood fastenings of the roof frame. Because the roof cap, directly prior to its fastening pins being mounted on the roof frame, is guided in a pivoting and sliding fashion on a curved segment of track deviating only slightly from the horizontal, the axial forces acting, via the hood drive, upon the fastening pins are limited. In order to ensure when closing the folding hood, even under unfavorable conditions, that the fastening pins latch-lock into their associated fastening, there is provided centrally between the lateral fastenings a central pull-tight mechanism, by whose tightening force the roof cap is pressed down onto the roof frame. By virtue of the therewith associated transverse advancement of the roof cap, the fastening pins are also forced into their fastening.

This pull-tight mechanism based on the draw key principle is technically relatively complex and adds fairly considerable cost to the locking arrangement of the roof cap. Moreover, for the draw key arrangement plus drive system, considerable installation space is required in the hollow cross-section of the roof frame. This installation space is not available, at least to the necessary extent, in every roof frame belonging to a convertible.

An object of the present invention is to further improve a locking arrangement such that, while maintaining a pull-tight effect, the locking arrangement can be more cheaply constructed and arranged in a more space-saving manner.

This object has been achieved according to the present invention by providing that the elements interact during closing of the cover and are deflection apparatus butting against each other, by virtue of which a sliding advancement of the cover is maintained after the deflection apparatus are run up against and is partially converted into the transverse advancement of the cover accompanying the axial advancement of the fastening pin.

By virtue of the interacting deflection apparatus, the sliding force at the roof cap acts almost exclusively tangentially to the track curve of the front edge of the roof cap and is partially converted into a vertical force component. The mutual coordination of the deflection apparatus must herein be conducted such that the fastening pin latch-locks reliably into the catch fastening. There is therefore no need for the auxiliary mechanism to have a dedicated drive.

The locking arrangement according to the present invention is especially suitable for motor-operated folding hoods, pivoting and sliding tops or the like in which, by virtue of the auxiliary force, a sufficient closing force is freely available. It would also however be conceivable, in principle, to move the cover manually with a push.

A structurally particularly simple deflection of the closing force can be guaranteed by a wedge guide which is linked to a relative motion of the interacting deflection apparatus. If a particularly robust construction is sought, then one of the deflection apparatus comprises a projecting stop, the rounded stop face of which is slide-guided on a wedge slope of the corresponding deflection apparatus.

To prevent any friction noises arising between the stop face and the wedge slope in the course of the relative motion, the stop face can be formed by the rolling periphery of a roller element. In order to achieve a more pronounced deflection of the closing force, in a final intrusion-motion phase of the fastening pin prior to the latching operation of the catch fastening, a first longitudinal segment of the wedge slope having a flat wedge angle can be adjoined by a longitudinal segment having a steeper wedge angle.

As an alternative to the wedge guide, a pendulum guide can be provided on a circular circuit which is inclined in accordance with the wedge slope. By the rolling of a rounded end of a guide lever on a stop face of the corresponding deflection apparatus, relative displacements between the interacting deflection apparatus can be prevented, so that here also, no friction noises arise. For spatial and cost reasons, it is particularly advantageous to dispose the deflection apparatus at the site of a notch and an associated fastening pin.

If a plurality of locking points for the securement of the cover are provided, then each locking point is expediently allocated a deflection pairing. The deflection apparatus supported by the fastening pin is preferably configured in one piece with the fastening pin, and the deflection apparatus is able to be formed onto the leading leg of the fastening pin.

Where a wedge slope is arranged on the fastening pin, this wedge slope can be produced by tilting the fastening pin legs extending in the longitudinal direction of the fastening pin. The leading longitudinal side of a fastening pin leg can thereby form the wedge slope, without the leg having to be provided with formed-on elements.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
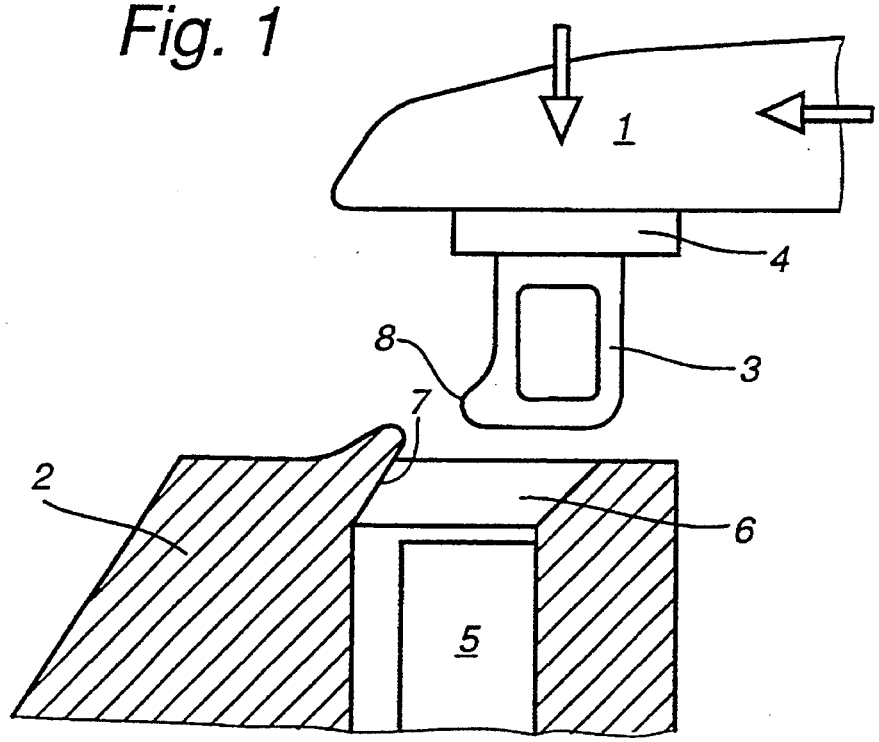
FIG. 1 is a partial cross-sectional elevation view showing a locking point between a roof cap of a folding hood and a front roof frame, in which deflection is effected by a wedge guide.

The locking point shown in FIG. 1 is one of two locking points between a roof cap 1 of a folding hood and a body roof frame 2 which runs above the windscreen of a convertible vehicle. The locking points are laterally offset between the roof cap 1 and roof frame 2, and are located in mirror-symmetry in relation to the longitudinal central plane of the convertible. In this respect, the arrangement of the locking points conforms exactly to known arrangements which is shown, in general representation, in DE-C1 39 24 295.

In the schematic longitudinal section through one of the two locking points as seen in FIG. 1, there is shown a fastening pin 3 which protrudes from the bottom side of the roof cap 1. The pin 3 is connected, relative immovably, to the roof cap 1 by a holding plate 4 screwed to the bottom side of the roof cap 1. In the auxiliary force-actuated closing operation of the folding hood, the fastening pin 3 intrudes automatically into the upwardly facing inlet opening of an associated rotary catch fastening 5 and rotates a known forked rotary catch (not shown) of the fastening into its pre-latch setting. Thereafter, the catch can be further rotated into its principal latch setting by a drive for the fastening 5 and hereupon pulls the roof cap 1 down into its end position on the roof frame 2.

In order to ensure that the end of the fastening pin 3 is supplied in a pinpointed manner to the fastening opening, the fastening 5 is disposed so that it springs back relative to the top side of the roof frame 2 so that a notch 6 cut into the top side of the roof frame 2 emerges, with a cross-section tapered in an approximate funnel shape, into the inlet opening of the fastening 5. On the forward-facing side, the notch 6 is limited by a wall which is inclined obliquely downwards at the front and thus runs virtually parallel to the rear limit wall of the notch 6. The front limit wall of the notch 6 merges rounded into the top side of the roof frame 2 but is otherwise a flat surface designated as a wedge slope 7.

In the lower end region of the fastening pin 3, a projecting stop protrudes from its front narrow side and is configured in one piece with the fastening pin 3. The projecting stop is limited by a rounded stop face 8 which merges, in an approximately semicircular peripheral curve, into the front and lower narrow side of the fastening pin 3.

Due to the above-described configuration of the locking arrangement, a sequence of motions is obtained whenever the hood is closed by its front end-closure in the following manner.

The roof cap 1 is moved forward, motionally directed by a pivot-driven hood structure, on a circular circuit of relatively large radius, and comes to rest, with the fastening pin 3 to the fore, on the roof frame 2. The fastening pins 3 hereupon impact with their end in the associated notch 6 and slide some way into the notch 6, whereupon, due to the centering effect of the notches 6, a lateral alignment of the roof cap 1 takes place. As the pivot-driving of the hood structure progresses, the roof cap 1 is acted upon, apart from by its weight, almost exclusively by forwardly directed sliding forces. These essentially horizontal sliding forces result in the fastening pin 3 running up with its stop face 8 against the wedge slope 7 of the notch 6 and in the stop face 8 subsequently sliding downwards along the wedge slope 7 until the middle leg of the fastening pin 3 has rotated the forked rotary catch of the associated fastening 5 into its pre-latch setting. A component of the sliding force exerted upon the roof cap 1 is dependent upon the angle of ascent of the wedge slope 7 and is thus converted into a downwardly directed vertical force which brings about axial advancement of the fastening pin 3 which is necessary in order to achieve the pre-latch setting associated with a corresponding transverse advancement of the roof cap 1.

In order to simplify the further description, the following further embodiments of the locking arrangement are more closely explained only with respect to their differences from the previously described embodiment of FIG. 1.

Figure 2:
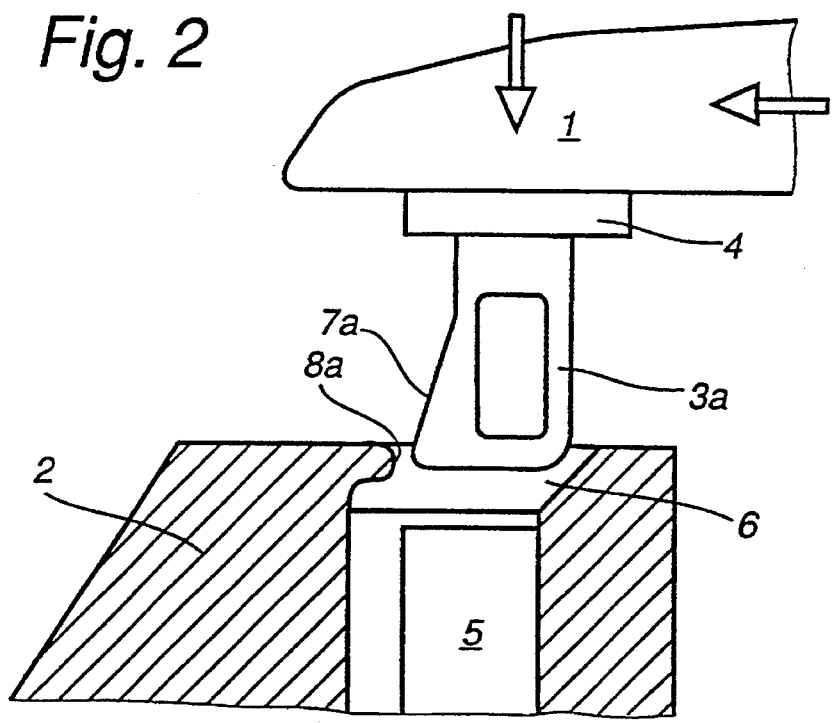
FIG. 2 shows a locking point similar to FIG. 1, but with a second embodiment of a wedge guide.

The embodiment according to FIG. 2 is a kinematic reversal of the embodiment according to FIG. 1, in which the projecting stop provided with the stop face 8a is disposed on the roof frame 2 and the wedge slope 7a is disposed on the front narrow side of a correspondingly longer fastening pin 3a. The stop which is fixed to the roof frame 2 in this embodiment lies approximately flush against the top side of the roof frame 2 and juts into the hollow cross-section of the notch 6. The wedge slope 7a has been obtained by a wedge-shaped cross-sectional enlargement of the front leg of the fastening pin 3a and extends up to an upper end region of the fastening pin 3a. Given a correspondingly long fastening pin 3a, a forced axial advancement of the fastening pin 3a with a relatively long advancement path can thus be produced.

Figure 3:
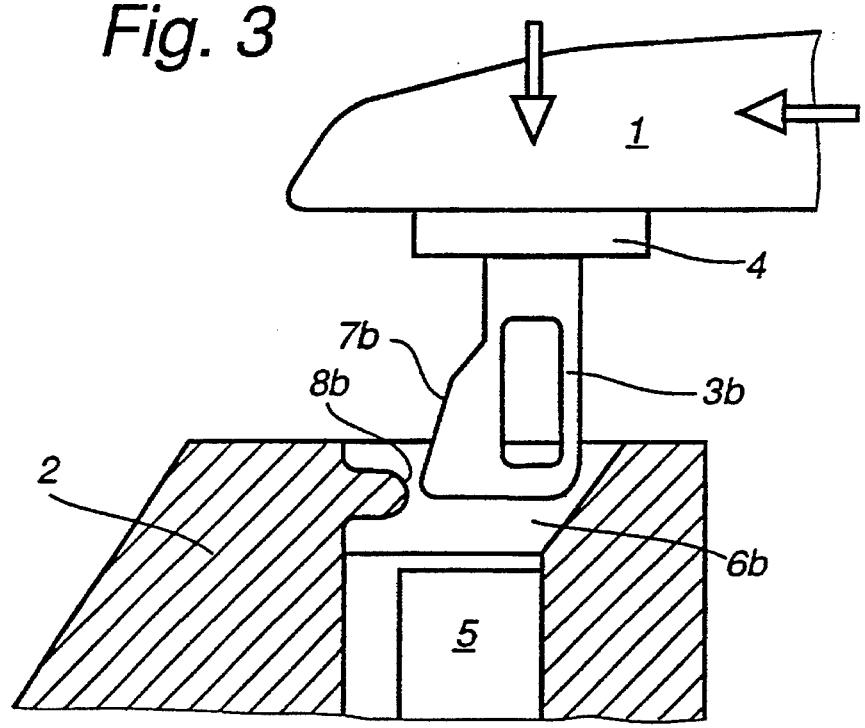
FIG. 3 shows a locking point similar to FIG. 1, but with a third embodiment of a wedge guide.

In a further modification, the stop provided with the rounded stop face 8a can also be offset downwards relative to the top side of the roof frame 2 and protrude from the front wall of the notch 6, as is shown in the case of the stop having the stop face 8b in the embodiment according to FIG. 3. It is herein necessary to ensure, however, by the sequence of motions of the roof cap 1, that the fastening pin 3b also runs up reliably against the stop face 8b. In addition, the notch 6b must have a greater intrusion depth. The wedge slope 7b further has, as viewed over its length, different wedge angles. A lower longitudinal segment of the wedge slope 7b is inclined at a lesser wedge angle than a thereto adjoining upper longitudinal segment. The longitudinal segments are dimensioned or sized such that the horizontal sliding path of the roof cap 1, upon downward sliding of the lower wedge slope segment on the stop face 8b, results in a relatively large axial advancement under relatively low axial force and then, upon downward sliding of the upper wedge slope segment, in a correspondingly smaller advancement under thereby greater axial force. As a result, in the final intrusion-motion phase of the fastening pin 3b, there is sufficient advancement force available to force even a stiff forked rotary catch into its pre-latch setting.

Figure 4:
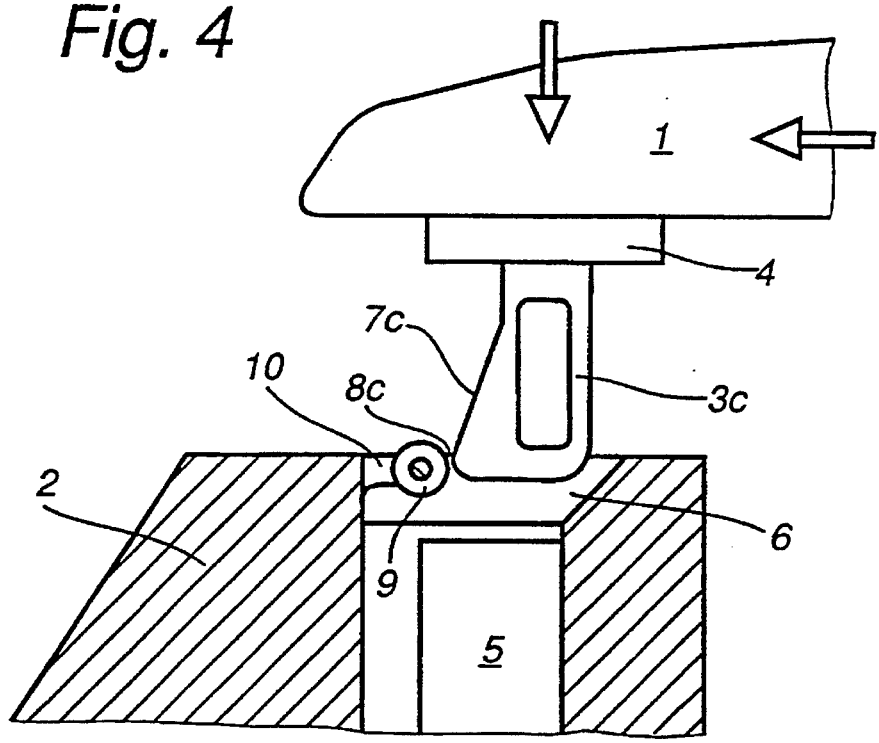
FIG. 4 shows a locking point similar to FIG. 1, but with a fourth embodiment of a wedge guide.

The embodiment of FIG. 4 has a fastening pin 3c which is similar to the fastening pin 3a and which has a wedge slope 7c extending over the predominant length of the front narrow side of the fastening pin 3c. This wedge slope 7c interacts, however, with a stop face 8c which is formed by a cylindrical periphery of a roller element comprising a centrically mounted roller 9 which passes transversely through the pivoting-motion plane of the fastening pin 3c. For the axle bearing, the ends of the roller 9 are embraced by a fork-shaped holder 10 which protrudes from the front limit wall of the notch 6 and thereby juts into the hollow cross-section of the notch 6.

Figure 5:
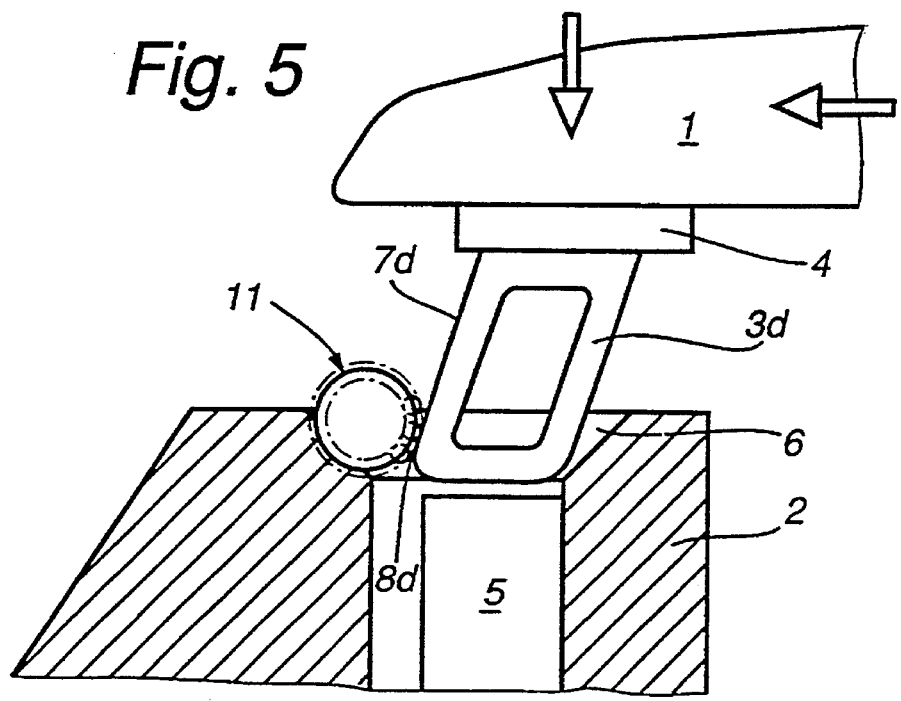
FIG. 5 shows a locking point similar to FIG. 1, but with a fifth embodiment of a wedge guide.

In the embodiment of FIG. 5, the technical complexity of providing an axle bearing of a roller on the roof frame 2 is eliminated, but still maintaining the roller element principle. To this end, a needle bearing 11 is fastened to the front limit wall of the notch 6. The needle bearing 11 stands out, that is about half its cross-section, from the top side of the roof frame 2 and juts with a peripheral segment into the hollow cross-section of the notch 6. The stop face 8d is thus formed by the rolling periphery of a needle mounted rotatably in the cage of the needle bearing 11. The wedge slope 7d of the fastening pin 3d runs up against the rolling periphery.

In a further structural simplification, the wedge slope 7d is achieved by two tilted legs extending in the longitudinal direction of the fastening pin 3d so as to be inclined obliquely downwards at the front in relation to their holding plate 4 and running parallel to each other. The legs thus form jointly with the transverse legs connecting them a parallelogram-like frame. This configuration enables an exact dimensioning, precisely tailored to the strength requirements, of all the fastening pin legs. In interaction with the needle bearing 11, the fastening pin 3d can additionally be dimensioned relatively shorter since the upper peripheral segment of the needle bearing 11, when the roof cap 1 is fully locked, can still lie in the region of overlap with the holding plate 4.

Figure 6:
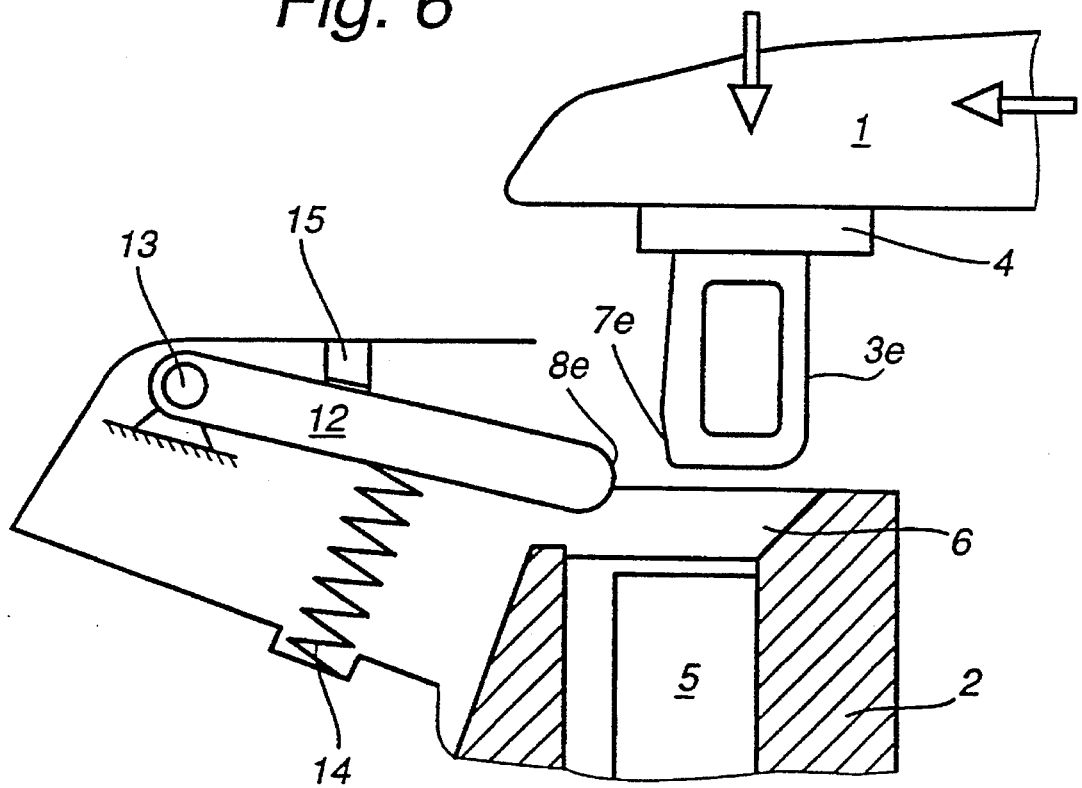
FIG. 6 shows a locking point similar to FIG. 1, having a deflection effected by a pendulum guide.

In the embodiment of FIG. 6, use is likewise made of a fastening pin 3e which is favorable in terms of material and weight, but which is configured as an approximately rectangular leg frame. The front narrow side of the fastening pin 3e thereby runs approximately at right-angles to the holding plate 4. A lower surface segment of this narrow side acts as a stop face 7e which, as the roof cap 1 is closed, runs up against a rounded stop face 8e. The stop face 8e is located at the end of a guide lever 12 which juts, through a recess in the front limit wall of the notch 6, into the hollow cross-section of the notch 6. At its opposite end, the guide lever 12 is attached to the roof frame 2 by an axle bearing 13 in the interior of the said roof frame.

In order to ensure that the guide lever 12 is held in an original setting, the lever 12 is pressed or biased by the force of a helical compression spring 14, acting upon the bottom side of the lever, so that the top side of the guide lever 12 bears against a stop 15 of the roof frame 2. The original setting is herein chosen such that the stop face 7e, as it impacts against the corresponding stop face 8e, encloses with the central longitudinal axis of the guide lever 12 an acute angle which is significantly less than 90°. After the fastening pin 3e has run up against the guide lever 12, the latter thus participates in the subsequent axial advancement of the fastening pin 3e, and the guide lever 12 is pivoted downwards counter to its spring-load in the clockwise direction as viewed in FIG. 6. Consequently, the pivoting movement results in a low-friction rolling motion of the rounded stop face 8e on the flat stop face 7e. Upon the release of the rotary catch fastening 5, the guide lever 12 snaps back again, under its spring-load, into its original setting shown in FIG. 6.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A locking arrangement for securing a pivotable-slidable cover to a counter-structure of a vehicle body, comprising a fastening pin protruding from and arranged relatively fixed to a bottom side of the cover, a catch fastening operatively arranged on the counter-structure and configured to interact with the fastening pin in a locking operation, a notch on the counter-structure configured to operate as an intrusion guide for intrusion of the fastening pin into the catch fastening and an auxiliary mechanism for providing axial advancement of the fastening pin in the notch and causing transverse advancement of the cover, said auxiliary mechanism having deflection elements associated with respective ones of the fastening pin and the catch fastening and one of which deflection elements extends into a cross-section of the catch fastening, for interacting with another of the deflection elements during closing of the cover so as to butt against each other and maintain a transverse advancement of the cover after the deflection elements interact accompanying the axial advancement of the fastening pin.

2. The locking arrangement according to claim 1, wherein the deflection elements for deflecting the sliding advancement of the cover comprises a wedge guide in which a wedge slope on one of the deflection elements interacts with a stop face on the another of the deflection apparatus.

3. The locking arrangement according to claim 2, wherein the stop face has a rounded configuration and limits a projecting stop.

4. The locking arrangement according to claim 3, wherein the stop face is a rolling periphery of a roller element.

5. The locking arrangement according to claim 2, wherein the wedge slope comprises two mutually adjoining longitudinal segments with different wedge angles.

6. The locking arrangement according to claim 1, wherein the sliding advancement of the cover is deflectable by a pendulum guide, comprising a rounded stop face at a free end of a guide lever arranged to be pivotable counter to a spring-load, said stop face arranged to interact with a flat segment of a corresponding stop face on another of the deflection elements such that the cover is pivoted with the guide lever, when the guide lever is moved counter to the spring-load.

7. The locking arrangement according to claim 1, wherein one of the deflection elements disposed on the counter-structure projects into the notch and another of the deflection elements is held on the fastening pin.

8. The locking arrangement according to claim 7, wherein the deflection element held by the fastening pin is integral with the fastening pin, a longitudinal side of a leg of the fastening-pin being provided with a deflection face.

9. The locking arrangement according to claim 8, wherein the fastening pin has two tilted legs extending in a longitudinal direction of the fastening pin and is configured, viewed in longitudinal section, as a parallelogram-shaped frame.

10. The locking arrangement according to claim 7, wherein the cover is lockable to the counter-structure at a plurality of locking points, and each locking point includes the interacting deflection element.

\* \* \* \* \*